United States Patent
Iwai (10) Patent No.: US 11,215,459 B2
(45) Date of Patent: Jan. 4, 2022

(54) OBJECT RECOGNITION DEVICE, OBJECT RECOGNITION METHOD AND PROGRAM

(71) Applicant: PIONEER CORPORATION, Tokyo (JP)

(72) Inventor: Tomoaki Iwai, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 443 days.

(21) Appl. No.: 16/302,067

(22) PCT Filed: May 18, 2016

(86) PCT No.: PCT/JP2016/064736
§ 371 (c)(1),
(2) Date: Nov. 15, 2018

(87) PCT Pub. No.: WO2017/199369
PCT Pub. Date: Nov. 23, 2017

(65) Prior Publication Data
US 2019/0145781 A1     May 16, 2019

(51) Int. Cl.
*G01C 21/28* (2006.01)
*G06K 9/00* (2006.01)
*G01C 21/36* (2006.01)

(52) U.S. Cl.
CPC ......... *G01C 21/28* (2013.01); *G01C 21/3602* (2013.01); *G06K 9/00791* (2013.01); *G06K 9/00818* (2013.01)

(58) Field of Classification Search
USPC ........................................................ 702/150
See application file for complete search history.

(56) References Cited

U.S. PATENT DOCUMENTS

| 10,783,478 B2* | 9/2020 | Studnicka | G06Q 20/26 |
| 2007/0291987 A1* | 12/2007 | Saka | G06K 9/00369 382/103 |
| 2008/0130954 A1* | 6/2008 | Taniguchi | G06K 9/00369 382/104 |
| 2010/0283845 A1* | 11/2010 | Yokochi | G06K 9/00805 348/135 |

(Continued)

FOREIGN PATENT DOCUMENTS

| JP | 2015-108604 A | 6/2015 |
| JP | 2015-222223 A | 12/2015 |
| WO | 2015-083538 A | 6/2015 |

OTHER PUBLICATIONS

International Search Report for related International Application No. PCT/JP2016/064736, dated Aug. 23, 2016; English translation provided; 2 pages.

*Primary Examiner* — Paul D Lee
(74) *Attorney, Agent, or Firm* — Procopio, Cory, Hargreaves & Savitch LLP (57) ABSTRACT

The object recognition device acquires external field information from by an external detection device arranged on a movable body, and acquires object position information indicating a position of an object existing around the movable body. Then, the object recognition device extracts prediction information, predicted to include information indicating the object, from the external field information based on the object position information, and recognizes the object based on the prediction information.

5 Claims, 5 Drawing Sheets

(56) References Cited

U.S. PATENT DOCUMENTS

2015/0029012 A1\* 1/2015 Mitani ............... G06K 9/00805
  340/436
2016/0305794 A1 10/2016 Horita et al.

\* cited by examiner

FIG. 2

$X_m, Y_m$ : MAP COORDINATE SYSTEM
$X_v, Y_v$ : VEHICLE COORDINATE SYSTEM
$P_{LM}(mx_m, my_m)$ : LANDMARK MAP POSITION IN MAP COORDINATE SYSTEM
$P'_{LV}(l'x_v, l'y_v)$ : LANDMARK PREDICTION POSITION IN VEHICLE COORDINATE SYSTEM
$P'_{VM}(x'_m, y'_m)$ : PREDICTED VEHICLE POSITION IN MAP COORDINATE SYSTEM
$\psi'_m$ : PREDICTED VEHICLE AZIMUTH ANGLE IN MAP COORDINATE SYSTEM $$\theta'_v = \tan \frac{l'y_v}{l'x_v}$$

FIG. 4

| $X_m, Y_m$ | : MAP COORDINATE SYSTEM |
| $X_v, Y_v$ | : VEHICLE COORDINATE SYSTEM |
| $P_{LM}(mx_m, my_m)$ | : LANDMARK MAP POSITION IN MAP COORDINATE SYSTEM |
| $P_{LV}(lx_v, ly_v)$ | : LANDMARK MEASUREMENT POSITION IN VEHICLE COORDINATE SYSTEM |
| $P_{VM}(x_m, y_m)$ | : ESTIMATED VEHICLE POSITION IN MAP COORDINATE SYSTEM |
| $\psi_m$ | : EXTIMATED VEHICLE AZIMUTH ANGLE IN MAP COORDINATE SYSTEM |

FIG. 5

OBJECT RECOGNITION DEVICE, OBJECT RECOGNITION METHOD AND PROGRAM

CROSS-REFERENCE TO RELATED APPLICATIONS

This application is a U.S. National Stage entry of PCT Application No: PCT/JP2016/064736 filed May 18, 2016, the contents of which are incorporated herein by reference.

TECHNICAL FIELD

The present invention relates to a technique of recognizing objects.

BACKGROUND TECHNIQUE

Conventionally, as a technique of estimating a vehicle position, Patent Reference 1 is known, for example. The technique of Patent Reference 1 detects positions of a plurality of landmarks with respect to a vehicle based on distances and directions of the plurality of landmarks with respect to the vehicle, and estimates a current position of the vehicle based on a result of collating the positions of at least one pair of the plurality of detected landmarks with the positions of the landmarks on a map.

PRIOR ART REFERENCES

Patent References

Patent Reference 1: Japanese Patent Application Laid-Open under No. 2015-222223

SUMMARY OF THE INVENTION

Problem to be Solved by the Invention

In such a technique, in case of detecting positions of landmarks from information obtained by external sensors, the objective landmarks are generally extracted and recognized from the whole measured information. Thus, there is a room for improvement.

The above is an example of the problem to be solved by the present invention. It is an object of the present invention to provide an object recognition device capable of efficiently recognizing objects from information obtained by external sensors.

Means for Solving the Problem

An invention described in claims is an object recognition device comprising: a first acquisition unit configured to acquire external field information outputted by an external detection device arranged on a movable body; a second acquisition unit configured to acquire object position information indicating a position of an object existing around the movable body; and a recognition unit configured to extract prediction information, predicted to include information indicating the object, from the external field information based on the object position information, and recognize the object based on the prediction information.

Another invention described in claims is an object recognition method comprising: a first acquisition process configured to acquire external field information outputted by an external detection device arranged on a movable body; a second acquisition process configured to acquire object position information indicating a position of an object existing around the movable body; and a recognition process configured to extract prediction information, predicted to include information indicating the object, from the external field information based on the object position information, and recognize the object based on the prediction information.

Still another invention described in claims is a program executed by an object recognition device including a computer, the program causing the computer to function as: a first acquisition unit configured to acquire external field information outputted by an external detection device arranged on a movable body; a second acquisition unit configured to acquire object position information indicating a position of an object existing around the movable body; and a recognition unit configured to extract prediction information, predicted to include information indicating the object, from the external field information based on the object position information, and recognize the object based on the prediction information.

DETAILED DESCRIPTION OF THE PREFERRED EMBODIMENTS

According to one aspect of the present invention, there is provided an object recognition device comprising: a first acquisition unit configured to acquire external field information outputted by an external detection device arranged on a movable body; a second acquisition unit configured to acquire object position information indicating a position of an object existing around the movable body; and a recognition unit configured to extract prediction information, predicted to include information indicating the object, from the external field information based on the object position information, and recognize the object based on the prediction information.

The above object recognition device acquires external field information from by an external detection device arranged on a movable body, and acquires object position information indicating a position of an object existing around the movable body. Then, the object recognition device extracts prediction information, predicted to include information indicating the object, from the external field information based on the object position information, and recognizes the object based on the prediction information. By this, it is sufficient to recognize the object based on the prediction information predicted to include the information indicating the object out of the external field information, and it is not necessary to execute recognition processing of the object for all the external field information. Therefore, the object can be efficiently recognized.

In one mode of the above object recognition device, the second acquisition unit further acquires attribute information indicating an attribute of the object, and the recognition unit recognizes the object by a recognition method determined based on the attribute information. In this mode, the recognition method is determined based on the attribute information indicating the attribute of the object, and then the object is recognized.

In another mode of the above object recognition device, the second acquisition unit acquires a first object position information indicating a position of a first object, a first attribute information indicating an attribute of the first object, a second object position information indicating a position of a second object different from the first object, and a second attribute information indicating an attribute of the second object. The recognition unit extracts a first prediction information, predicted to include information indicating the first object, from the external field information based on the first object position information, and recognizes the first object based on the first prediction information by a first recognition method determined based on the first attribute information. The recognition unit extracts a second prediction information, predicted to include information indicating the second object, from the external field information based on the second object position information, and recognizes the second object based on the second prediction information by a second recognition method determined based on the second attribute information. In this mode, the first recognition method and the second recognition method are determined based on the attribute information indicating the attribute of the object, respectively, and then the first object and the second object are recognized.

In still another mode of the object recognition device, the recognition unit recognizes the object by a different method for each of the attributes of the objects. Thus, the object can be recognized by the recognition method appropriate for the attribute of the object.

According to another aspect of the present invention, there is provided an object recognition method comprising: a first acquisition process configured to acquire external field information outputted by an external detection device arranged on a movable body; a second acquisition process configured to acquire object position information indicating a position of an object existing around the movable body; and a recognition process configured to extract prediction information, predicted to include information indicating the object, from the external field information based on the object position information, and recognize the object based on the prediction information. By this method, it is sufficient to recognize the object based on the prediction information predicted to include the information indicating the object out of the external field information, and it is not necessary to execute recognition processing of the object for all the external field information. Therefore, the object can be efficiently recognized.

According to still another aspect of the present invention, there is provided a program executed by an object recognition device including a computer, the program causing the computer to function as: a first acquisition unit configured to acquire external field information outputted by an external detection device arranged on a movable body; a second acquisition unit configured to acquire object position information indicating a position of an object existing around the movable body; and a recognition unit configured to extract prediction information, predicted to include information indicating the object, from the external field information based on the object position information, and recognize the object based on the prediction information. By executing this program by a computer, the above object recognition device can be realized. This program may be appropriately handled in a manner stored in a storage medium.

EMBODIMENTS

A preferred embodiment of the present invention will be described below with reference to the attached drawings.

[Configuration]

Figure 1:
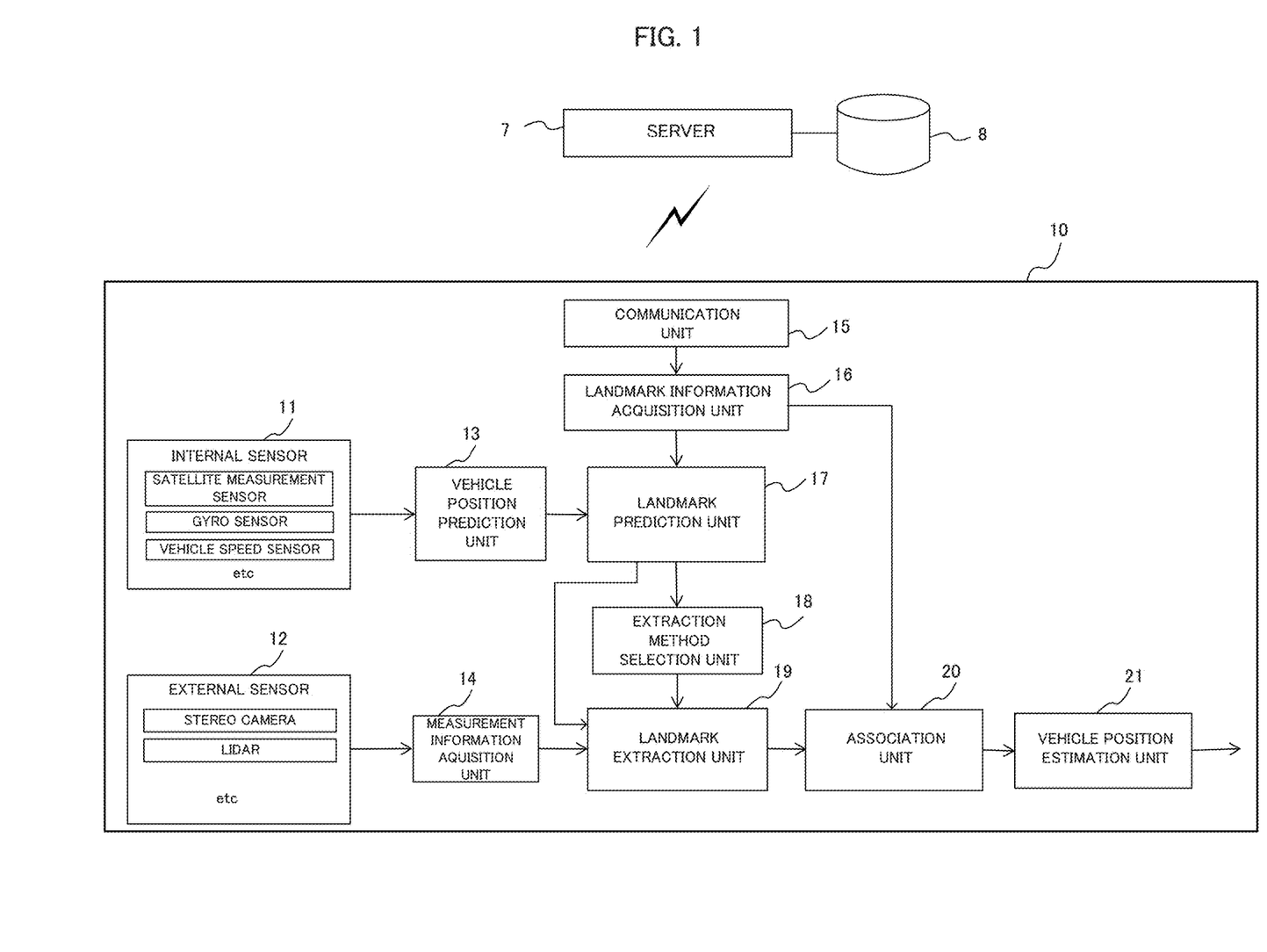
FIG. 1 is a block diagram illustrating a configuration of a vehicle position estimation device according to an embodiment.

FIG. 1 illustrates a schematic configuration of a vehicle position estimation device to which an object recognition device according to the present invention is applied. The vehicle position estimation device 10 is loaded on a vehicle, and is configured to be able to communicate with a server 7 such as a cloud server by wireless communication. The server 7 is connected to a database 8, and the database 8 stores high definition map. The vehicle position estimation device 10 communicates with the server 7, and downloads landmark information related to landmarks around the position of the vehicle.

The high definition map stored in the database 8 includes landmark information for each of the landmarks. The landmark information includes, for each landmark ID identifying a landmark, a landmark map position indicating the position of the landmark on the map, and a landmark attribute indicating a kind and/or a characteristic feature of the landmark. The landmark attribute is prepared in accordance with the kind and/or the characteristic feature of the landmark, and basically includes the kind of the landmark and the feature information of the landmark. For example, if the landmark is a road sign, the landmark attribute includes "Road Sign" as the kind of the landmark, and includes the shape (circle, triangle, squire, etc.) and the size of the road sign as well as a reflection intensity of the road sign as the feature information. If the landmark is a telegraph pole, the land mark attribute includes "Telegraph Pole" as the kind of the landmark, and includes the shape (curvature and radius of its section) and the size of the telegraph pole as the feature information. The landmark may be road surface markers, traffic signals and various buildings, etc.

Meanwhile, the vehicle position estimation device 10 includes an internal sensor 11, an external sensor 12, a vehicle position prediction unit 13, a measurement information acquisition unit 14, a communication unit 15, a landmark information acquisition unit 16, a landmark prediction unit 17, an extraction method selection unit 18, a landmark extraction unit 19, an association unit 20 and a vehicle position estimation unit 21. The vehicle position prediction unit 13, the measurement information acquisition unit 14, the landmark information acquisition unit 16, the landmark prediction unit 17, the extraction method selection unit 18, the landmark extraction unit 19, the association unit 20 and the vehicle position estimation unit 21 are realized by a computer such as a CPU which executes a program prepared in advance.

The internal sensor 11 measures the position of the vehicle as a GNSS (Global Navigation Satellite System)/IMU (Inertial Measurement Unit) composite navigation system, and includes a satellite measurement sensor (e.g. GPS), a gyro sensor and a vehicle speed sensor. The vehicle position prediction unit 13 predicts the vehicle position by the GNSS/IMU composite navigation based on the output of the internal sensor 11, and supplies the predicted vehicle position to the landmark prediction unit 17.

The external sensor 12 is a sensor for detecting objects around the vehicle, and includes a stereo camera and a Lidar (Light Detection and Ranging). The measurement information acquisition unit 14 acquires the measurement information from the external sensor 12, and supplies it to the landmark extraction unit 19.

The communication unit 15 performs wireless communication with the server 7. The landmark information acquisition unit 16 receives the landmark information related to the landmark existing around the vehicle from the server 7 via the communication unit 15, and supplies it to the landmark prediction unit 17. Also, the landmark information acquisition unit 16 supplies the landmark map position included in the landmark information to the association unit 20.

The landmark prediction unit 17 determines a landmark prediction range, in which a landmark is predicted to exist, based on the landmark map position included in the landmark information and the predicted vehicle position acquired from the vehicle position prediction unit 13, and supplies it to the landmark extraction unit 19. Also, the landmark prediction unit 17 supplies the landmark attribute included in the landmark information to the extraction method selection unit 18.

The extraction method selection unit 18 determines a characteristic object extraction method that the landmark extraction unit 19 executes to extract the landmark. As described above, the landmark includes various kinds such as the road sign and the telegraph pole, and the method of extracting the landmark is different between the kinds of the landmarks. Namely, the characteristic object extraction method executed by the landmark extraction unit 19 is different between the kinds of the landmarks. Specifically, the landmark extraction unit 19 extracts the characteristic object having the characteristic feature indicated by the feature information included in the landmark attribute. Therefore, based on the landmark attribute of the landmark to be extracted, the extraction method selection unit 18 selects the characteristic object extraction method corresponding to the landmark, and instructs it to the landmark extraction unit 19.

The landmark extraction unit 19 extracts the landmark based on the landmark prediction range supplied from the landmark prediction unit 17 and the measurement information supplied from the measurement information acquisition unit 14. Specifically, the landmark extraction unit 19 extracts the characteristic object from the measurement information within the landmark prediction range, and regards it as a landmark. At that time, the landmark extraction unit 19 extracts the landmark by the characteristic object extraction method determined by the extraction method selection unit 18, i.e., the characteristic object extraction method appropriate for the landmark attribute. Then, the landmark extraction unit 19 outputs the landmark measurement position of the extracted landmark to the association unit 20.

The association unit 20 stores the landmark measurement position acquired from the landmark extraction unit 19 and the landmark map position acquired from the landmark information acquisition unit 16 in association with the landmark ID. Thus, information (hereinafter referred to as "association information") associating the landmark map position and the landmark measurement position with the landmark ID is generated.

Then, the vehicle position estimation unit 21 estimates the vehicle position and the vehicle azimuth angle of the vehicle by using the landmark map position and the landmark measurement position included in the association information for at least two landmarks.

In the above configuration, the external sensor 11 is an example of the external detection device according to the invention, the measurement information acquisition unit 14 is an example of the first acquisition unit of the invention, the landmark information acquisition unit 16 is an example of the second acquisition unit of the invention, and the landmark extraction unit 19 is an example of the recognition unit of the invention. Also, the landmark map position corresponds to the object position information in the invention, the measurement information corresponds to the external field information of the invention, and the measurement information in the landmark prediction range corresponds to the prediction information of the invention.

[Determination of Landmark Prediction Range]

Figure 2:
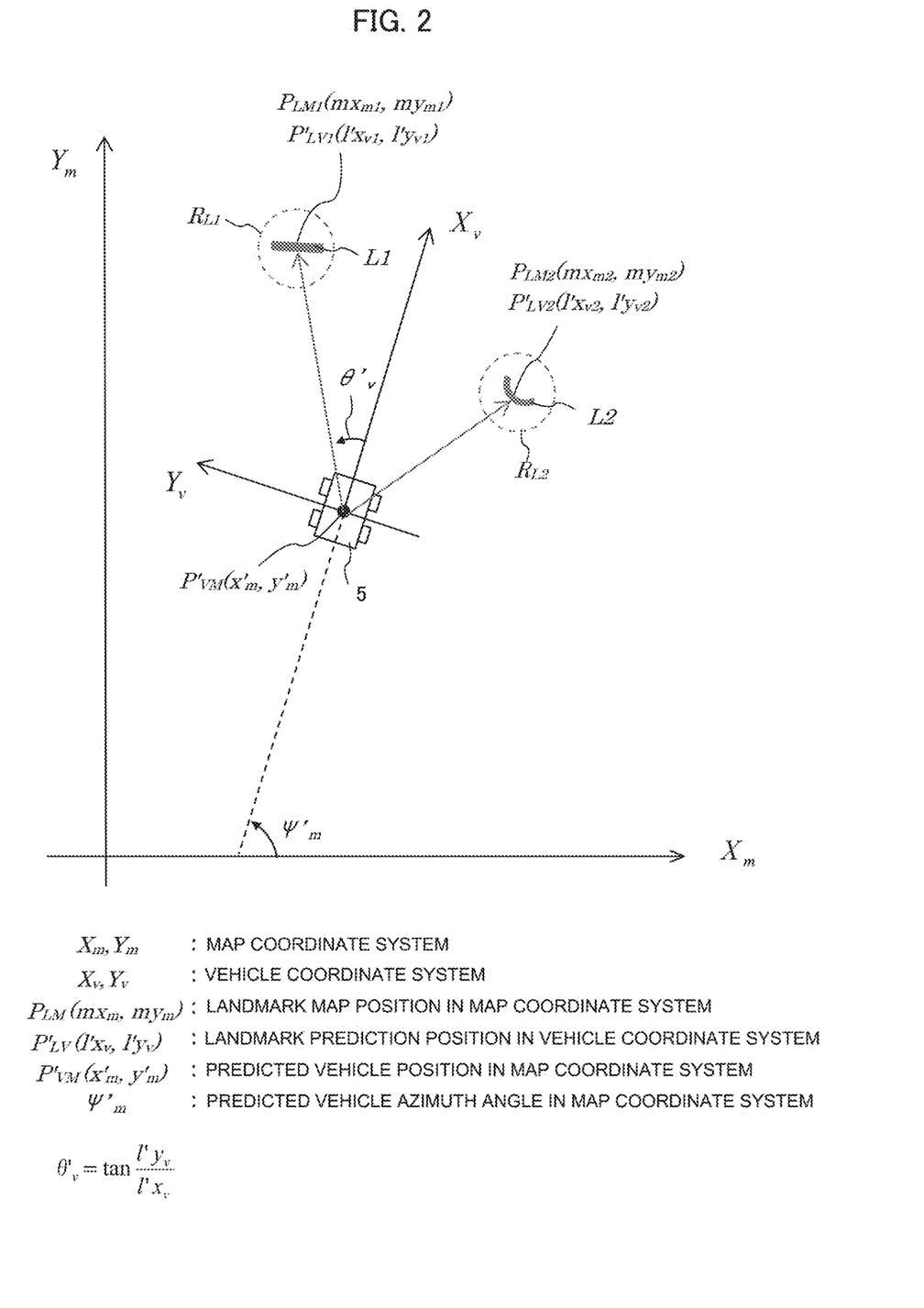
FIG. 2 is a diagram for explaining a determination method of a landmark prediction range.

Next, description will be given of the determination method of the landmark prediction range executed by the landmark prediction unit 17. FIG. 2 illustrates the determination method of the landmark prediction range. As illustrated, a vehicle 5 exists in a map coordinate system $(X_m, Y_m)$, and a vehicle coordinate system $(X_v, Y_v)$ is defined on the basis of the position of the vehicle 5. Specifically, the traveling direction of the vehicle 5 is defined as the $X_v$-axis of the vehicle coordinate system, and the direction perpendicular thereto is defined as $Y_v$-axis of the vehicle coordinate system.

Around the vehicle 5, there exist landmarks L1, L2. In this embodiment, it is assumed that the landmark L1 is a road sign and the landmark L2 is a telegraph pole. The positions of the landmarks L1, L2 in the map coordinate system, i.e., the landmark map positions are included in the high definition map as described above, and are supplied from the landmark information acquisition unit 16. In FIG. 2, it is assumed that the landmark map position of the landmark L1 is $P_{LM1}(mx_{m1}, my_{m1})$ and the landmark map position of the landmark L2 is $P_{LM2}(mx_{m2}, my_{m2})$. On the other hand, the predicted vehicle position $P'_{VM}(x'_m, y'_m)$ is supplied from the vehicle position prediction unit 13.

The landmark prediction unit 17 calculates the landmark prediction position $P'_{LV1}(l'x_{v1}, l'y_{v1})$ in the vehicle coordinate system based on the predicted vehicle position $P'_{VM}$ and the landmark map position $P_{LM1}$ of the landmark L1, and determines the landmark prediction range $R_{L1}$ on the basis of the landmark prediction position $P'_{LV1}$. Similarly, the landmark prediction unit 17 calculates the landmark prediction position $P_{LV2}(l'x_{v2}, l'y_{v2})$ in the vehicle coordinate system based on the predicted vehicle position $P'_{VM}$ and the landmark map position $P_{LM2}$ of the landmark L2, and determines the landmark prediction range $R_{L2}$ on the basis of the landmark prediction position $P'_{LV2}$.

The landmark prediction range R indicates a range in which a landmark L is predicted to exist. Since the predicted vehicle position $P'_{VM}$ acquired by using the internal sensor 11 includes an error of a certain degree, the landmark prediction unit 17 determines the landmark prediction range R in consideration of the error. For example, the landmark prediction unit 17 determines a circle having the landmark prediction position $P'_{LV}$ as its center and having a radius of a predetermined distance.

By determining the landmark prediction range R in this manner, the landmark extraction unit 19 may extract the landmark based on the measurement information belonging to the landmark prediction range R, out of the whole measurement information acquired by the external sensor 12. Generally, the external sensor such as a Lidar measures a broad range such as all direction (360°) or 270° direction except for the rear direction of the vehicle, and generates the measurement information of such a broad range. In this case, if the landmark extraction processing is executed for all the measurement information obtained in the broad range to extract the landmark, the processing amount becomes huge. In contrast, this embodiment determines the range in which landmark is predicted to exist as the landmark prediction range R based on the predicted vehicle position acquired by using the internal sensor 11, and executes the landmark extraction processing only for the measurement information belonging to that range. Therefore, the processing amount can be remarkably reduced, and the landmarks can be detected efficiently.

As actual processing, the external sensor 12 measures the broad range as described to output the measurement information of the broad range, and the landmark extraction unit 19 may extract only the measurement information in the landmark prediction range R to be subjected to the landmark extraction processing. Instead, the external sensor 12 may be controlled to measure only in the landmark prediction range R.

[Landmark Extraction Processing]

Figure 3:
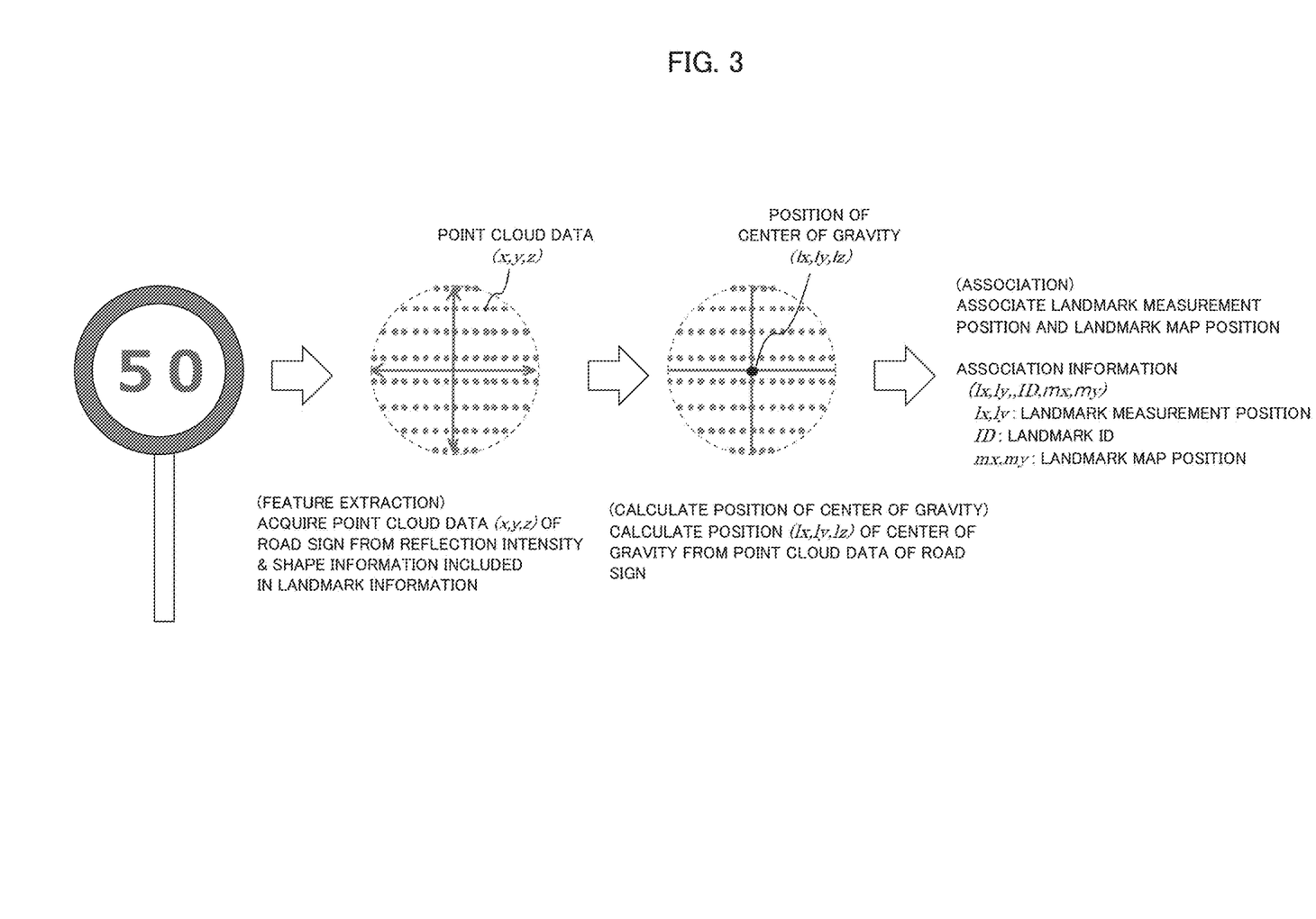
FIG. 3 illustrates an example of landmark extraction processing.

Next, the landmark extraction processing will be described. FIG. 3 illustrates an example of the landmark extraction processing. In this example, it is assumed that the landmark is a road sign. In this case, the landmark attribute included in the landmark information that the landmark information acquisition unit 16 acquires from the server 7 includes "Road Sign" as the landmark kind. Based on this information, the extraction method selection unit 18 selects the characteristic object extraction method corresponding to the road sign, and instructs it to the landmark extraction unit 19.

The landmark extraction unit 19 extracts the landmark based on the measurement information acquired from the measurement information acquisition unit 14. The Lidar serving as the external sensor 12 emits light pulses to its circumference, and receives the light pulses reflected by surrounding objects to generate point cloud data. The point cloud data includes the position (three-dimensional position) and reflection intensity data of the object surrounding the vehicle. The measurement information acquisition unit 14 outputs the point cloud data to the landmark extraction unit 19 as the measurement information. The interval of the point cloud data generated by the Lidar depends on the distance from the Lidar to the measurement target, the direction of the measurement target and the angular resolution of the Lidar.

If the landmark is a road sign as described above, the landmark attribute includes "Road Sign" as the landmark kind, and includes the shape (size) information and the reflection intensity as the feature information. Therefore, the landmark extraction unit 19 extracts the characteristic object based on the shape information and the reflection intensity. Specifically, the landmark extraction unit 19 extracts the point cloud data of the circle corresponding to the road sign as shown in FIG. 3, from the point cloud data acquired from the measurement information acquisition unit 14, based on the shape information and the reflection intensity of the road sign. Then, the landmark extraction unit 19 calculates the position (lx, ly, lz) of the center of gravity of the point cloud data of the extracted road sign, and outputs it to the association unit 20 as the landmark measurement position.

The association unit 20 associates the landmark measurement position acquired from the landmark extraction unit 19 with the landmark map position acquired from the landmark information acquisition unit 16. Specifically, the association unit 20 associates the landmark ID of the landmark, the landmark measurement position and the landmark map position to generate the association information, and stores it. Thus, the landmark measurement position and the landmark map position are associated with each other for the landmark extracted by the landmark extraction unit 19. In this embodiment, since the landmark map position is the position on the two-dimensional map coordinate system, the association unit 20 uses the two-dimensional position (lx, ly) of the calculated three-dimensional position (lx, ly, lz) of the center of gravity. The association information thus generated is used in the vehicle position estimation by the vehicle position estimation unit 21.

While the landmark is a road sign in the example of FIG. 3, the landmark extraction is performed in the same manner for the other kinds of landmarks. However, the characteristic object extraction method is different for each kind of landmark. For example, when the landmark is a telegraph pole, the landmark attribute includes information of the shape (arc shape, curvature and radius of the section) and size of the telegraph pole as the feature information. Therefore, the landmark extraction unit 19 extracts, as the landmark, the characteristic object corresponding to the telegraph pole from the measurement information based on the information of the shape and size of the telegraph pole, and outputs its center position as the landmark measurement position. When the landmark is a road surface marker, the landmark attribute includes the shape information and the reflection intensity of the road surface marker as the feature information. Therefore, the landmark extraction unit 19 extracts, as the landmark, the characteristic object corresponding to the road surface marker from the measurement information based on the shape information and the reflection intensity, and outputs its center position as the landmark measurement position. When the landmark is another object such as a traffic signal, the landmark extraction unit 19 may extract the landmark based on the kind and the feature information of the landmark and output its predetermined position such as its center position as the landmark measurement position.

As described above, in this embodiment, the attribute information of each landmark is included in the landmark information in the high definition map, and when the landmark is extracted from the measurement information acquired by the external sensor 12, the characteristic object extraction method appropriate for the attribute of the landmark is used. Thus, the landmark can be efficiently extracted. Namely, if the attribute of the landmark is not used unlike the present invention, since the landmark to be extracted is unknown, it is necessary to perform the characteristic object extraction methods appropriate for all possible landmarks in order, i.e., the method appropriate for the road sign, the method appropriate for the telegraph pole, the method appropriate for the road surface marker, etc. In contrast, if the attribute of the landmark is known in advance like this embodiment, it is only necessary to perform the characteristic object extraction method appropriate for the landmark. For example, in the case of FIG. 2, it is known from the landmark attribute that the landmark L1 is a road sign and the landmark L2 is a telegraph pole. Therefore, the characteristic object extraction processing appropriate for the road sign may be executed for the landmark prediction range $R_{L1}$, and the characteristic object extraction processing appropriate for the telegraph pole may be executed for the landmark prediction range $R_{L2}$. Thus, the processing load on the landmark extraction may be reduced, and erroneous detection and/or detection failure may be prevented.

[Vehicle Position Estimation]

Figure 4:
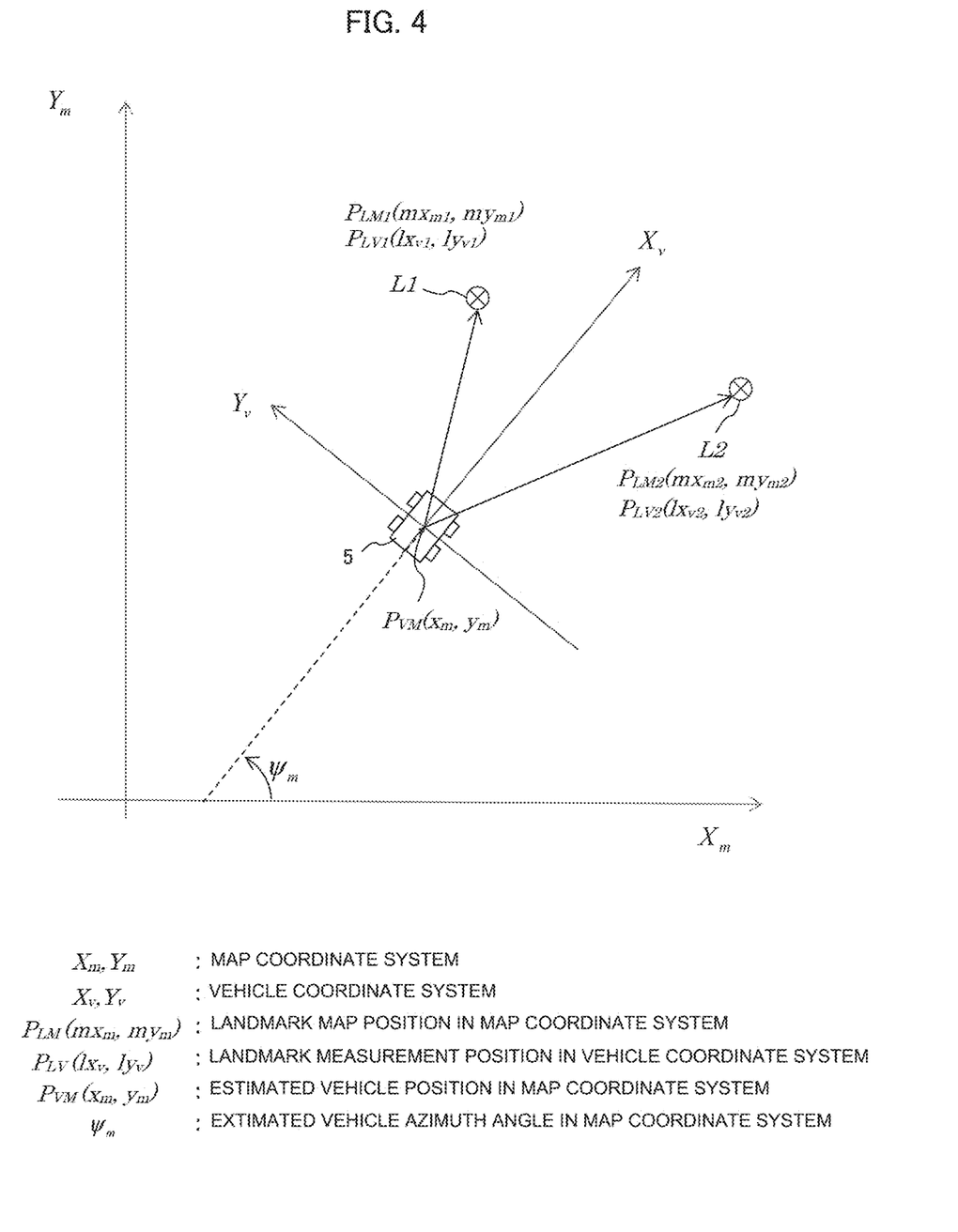
FIG. 4 is a diagram for explaining a method of estimating a vehicle position.

Next, the vehicle position estimation by the vehicle position estimation unit 21 will be described. The vehicle position estimation unit 21 estimates the vehicle position and the vehicle azimuth angle of the vehicle by using the association information of two landmarks generated by the association unit 20. In the following description, the vehicle position obtained by the vehicle position estimation will be referred to as "the estimated vehicle position", and the vehicle azimuth angle obtained by the vehicle position estimation will be referred to as "the estimated vehicle azimuth angle".

FIG. 4 illustrates an example of the vehicle position estimation. The vehicle 5 is located in the map coordinate system $(X_m, Y_m)$, and the vehicle coordinate system $(X_v, Y_v)$ is defined on the basis of the position of the vehicle 5. The estimated vehicle position of the vehicle 5 is indicated by $P_{VM}(x_m, y_m)$, and the estimated vehicle azimuth angle is indicated by $\psi_m$.

The vehicle position estimation unit 21 acquires the association information of the two landmarks L1, L2 from the association unit 20. Specifically, the vehicle position estimation unit 21 acquires the landmark map position $P_{LM1}(mx_{m1}, my_{m1})$ and the landmark measurement position $P_{LV1}(lx_{v1}, ly_{v1})$ for the landmark L1, and acquires the landmark map position $P_{LM2}(mx_{m2}, my_{m2})$ and the landmark measurement position $P_{LV2}(lx_{v2}, ly_{v2})$ for the landmark L2.

By using those landmark map positions and the landmark measurement positions, the following equations are obtained for the estimated vehicle azimuth angle $\psi_m$.

$$\sin\psi_m = \frac{AD - BC}{C^2 + D^2} \quad (1)$$

$$\cos\psi_m = \frac{BD + AC}{C^2 + D^2} \quad (2)$$

$$A = lx_{v1} - lx_{v2}, B = ly_{v1} - ly_{v2}$$
$$C = mx_{m1} - mx_{m2}, D = my_{m1} - my_{m2}$$

Therefore, the vehicle position estimation unit 21 calculates the estimated vehicle position $P_{VM}(x_m, y_m)$ and the estimated vehicle azimuth angle $\psi_m$ by the following equations.

$$x_m = mx_{m1} - lx_{v1} \cos\psi_m + ly_{m1} \sin\psi_m \quad (3)$$

$$y_m = my_{m1} - lx_{v1} \sin\psi_m - ly_{v1} \cos\psi_m \quad (4)$$

$$\psi_m = \cos^{-1}\psi_m = \sin^{-1}\psi_m \quad (5)$$

Thus, the vehicle position estimation device 10 can estimate the vehicle position and the vehicle azimuth angle based on the landmark map positions included in the high definition map and the landmark measurement positions acquired by using the external sensor 12.

[Vehicle Position Estimation Processing]

Figure 5:
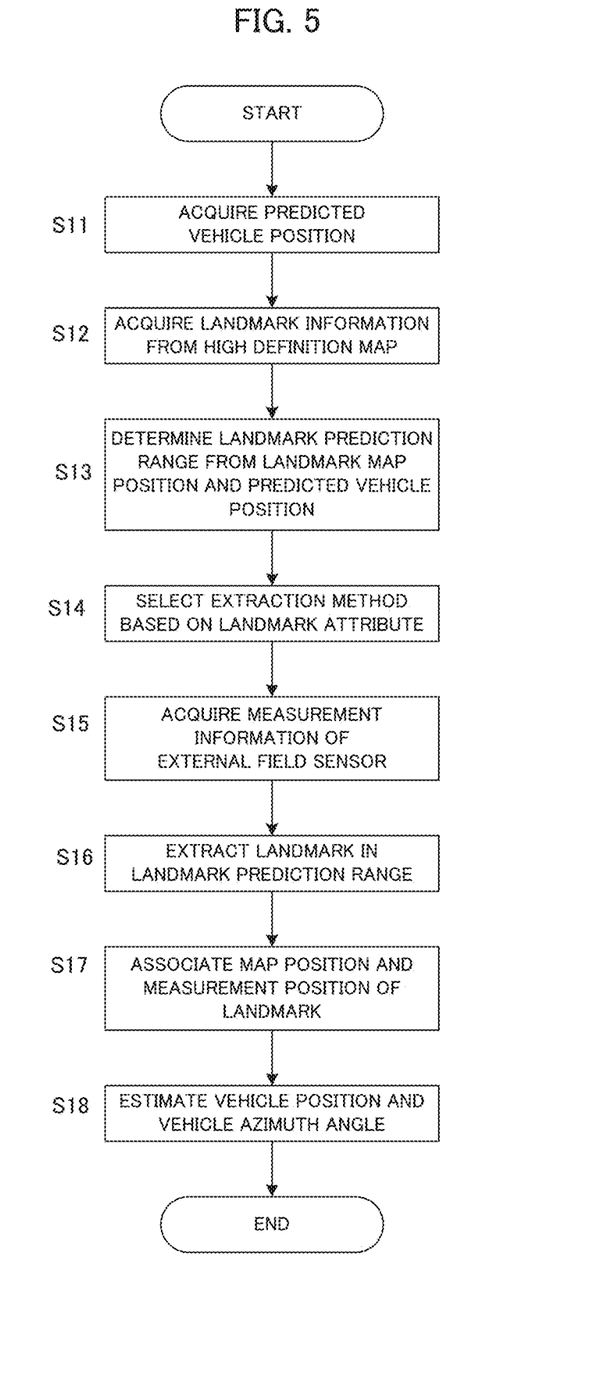
FIG. 5 is a flowchart of vehicle position estimation processing.

Next, the processing flow by the vehicle position estimation device 10 will be described. FIG. 5 is a flowchart of the processing by the vehicle position estimation device 10. This processing is realized by a computer such as a CPU which executes a program prepared in advance to function as the respective components shown in FIG. 1.

First, the vehicle position prediction unit 13 acquires the predicted vehicle position $P'_{VM}$ based on the output of the internal sensor (step S11). Next, the landmark information acquisition unit 16 connects to the server 7 via the communication unit 15, and acquires the landmark information from the high definition map stored in the database 8 (step S12). The landmark information includes the landmark map position and the landmark attribute as described above, and the landmark information acquisition unit 16 supplies the landmark map position to the association unit 20. It is noted that steps S11 and S12 may be exchanged.

Next, the landmark prediction unit 17 determines the landmark prediction range R based on the landmark map position included in the landmark information acquired in step S12 and the predicted vehicle position acquired in step S11, and supplies the landmark prediction range R to the landmark extraction unit 19 (step S13).

Next, the extraction method selection unit 18 selects the characteristic object extraction method based on the landmark attribute acquired in step S12 (step S14). Specifically, the extraction method selection unit 18 selects the characteristic object extraction method appropriate for the kind of the landmark indicated by the landmark attribute. For example, when the landmark is a road sign, the extraction method selection unit 18 selects the characteristic object extraction method appropriate for the road sign as described with reference to FIG. 3, and instructs the characteristic object selection method to the landmark extraction unit 19.

The landmark extraction unit 19 acquires the measurement information outputted by the external sensor 12 from the measurement information acquisition unit 14 (step S15), and extracts the landmark within the landmark prediction range R acquired from the landmark prediction unit 17 by the characteristic object extraction method instructed by the extraction method selection unit 18 (step S16). The landmark extraction unit 19 outputs the landmark measurement position to the association unit 20 as the landmark extraction result.

The association unit 20 associates the landmark map position acquired from the landmark information acquisition unit 16 with the landmark measurement position acquired from the landmark extraction unit 19 to generate the association information, and supplies the association information to the vehicle position estimation unit 21 (step S17). Then, the vehicle position estimation unit 21 estimates the vehicle position and the vehicle azimuth angle by the method described with reference to FIG. 5, by using the association information of the two landmarks (step S18). Thus, the estimated vehicle position and the estimated vehicle azimuth angle are outputted.

INDUSTRIAL APPLICABILITY

This invention can be used for a technique of acquiring surrounding environment information using an external sensor.

BRIEF DESCRIPTION OF REFERENCE NUMBERS

5 Vehicle
7 Server
8 Database
10 Vehicle position estimation device
11 Internal sensor
12 External sensor
13 Vehicle position prediction unit
14 Measurement information acquisition unit
17 Landmark prediction unit
18 Extraction method selection unit
19 Landmark extraction unit
20 Vehicle position estimation unit

The invention claimed is:
1. An object recognition device comprising:
at least one memory configured to store a program; and at least one central processing unit (CPU) coupled to the memory and configured to execute the program to:
acquire external field information generated by a sensor arranged on a movable body;
acquire object position information indicating a position of an object existing around the movable body, and attribute information including kind information indicating a kind of the object; and
select a recognition method corresponding to the kind of the object based on the acquired kind information, from plural recognition methods of recognizing the object from the external field information positioned within an object prediction range determined based on the object position information; and
recognize the object by the selected recognition method.

2. The object recognition device according to claim 1, wherein the at least one CPU is further configured to:
acquire a first object position information indicating a position of a first object, a first attribute information indicating an attribute of the first object, a second object position information indicating a position of a second object different from the first object, and a second attribute information indicating an attribute of the second object,
extract a first prediction information, predicted to include information indicating the first object, from the external field information based on the first object position information, and recognizes the first object based on the first prediction information by a first recognition method determined based on the first attribute information, and
extract a second prediction information, predicted to include information indicating the second object, from the external field information based on the second object position information, and recognizes the second object based on the second prediction information by a second recognition method determined based on the second attribute information.

3. The object recognition device according to claim 1, wherein the at least one CPU is further configured to recognize the object by a different method for each of the attributes of the objects.

4. An object recognition method comprising:
a first acquisition process configured to acquire external field information generated by a sensor arranged on a movable body;
a second acquisition process configured to acquire object position information indicating a position of an object existing around the movable body, and attribute information including kind information indicating a kind of the object; and
a recognition process configured to:
select a recognition method corresponding to the kind of the object based on the acquired kind information, from plural recognition methods of recognizing the object from the external field information positioned within an object prediction range determined based on the object position information, and
recognize the object by the selected recognition method.

5. A non-transitory computer-readable medium storing a program executed by a computer in an object recognition device, the program causing the computer to:
acquire external field information generated by a sensor arranged on a movable body;
acquire object position information indicating a position of an object existing around the movable body, and attribute information including kind information indicating a kind of the object; and
select a recognition method corresponding to the kind of the object based on the acquired kind information, from plural recognition methods of recognizing the object from the external field information positioned within an object prediction range determined based on the object position information; and
recognize the object by the selected recognition method.

* * * * *